US005402100A

United States Patent [19]

[11] Patent Number: 5,402,100

[45] Date of Patent: Mar. 28, 1995

Urbanek et al.

[54] OVERVOLTAGE SURGE ARRESTER WITH MEANS FOR PROTECTING ITS PORCELAIN HOUSING AGAINST RUPTURE BY ARC-PRODUCED SHOCKS

[75] Inventors: Josef Urbanek, Media, Pa.; David S. Birrell, Cummington, Mass.

[73] Assignee: General Electric Company, Schenectady, N.Y.

[21] Appl. No.: 163,273

[22] Filed: Dec. 6, 1993

[51] Int. Cl.[6] .......... H01C 7/10; H02H 9/04

[52] U.S. Cl. .......... 338/21; 361/127

[58] Field of Search .......... 338/20, 21, 50, 51; 361/117, 127, 126, 128

[56] References Cited

U.S. PATENT DOCUMENTS

| | | | |
|---|---|---|---|
| 2,739,213 | 3/1956 | Beckford | 338/51 |
| 4,092,294 | 5/1978 | Stetson | 361/126 |
| 4,100,588 | 7/1978 | Kresge | 361/127 |
| 4,161,012 | 7/1979 | Cunningham | 361/127 X |
| 4,218,721 | 8/1980 | Stetson | 361/117 |
| 4,335,417 | 6/1982 | Sakshaugh et al. | 361/127 |
| 4,404,614 | 9/1983 | Koch et al. | 361/128 |
| 4,571,660 | 2/1986 | Mitsumatsu et al. | 361/127 |
| 4,910,632 | 3/1990 | Shiga et al. | 361/127 |

OTHER PUBLICATIONS

Adhesive, Ceramics and High Temperature Materials Handbook, Cotronics Corp., Brooklyn, N.Y.; vol. 92, No. 18; pp. 3, 4, and inside back cover; copyright 1992.

*Primary Examiner*—Marvin M. Lateef
*Attorney, Agent, or Firm*—William Freedman; Robert C. Lampe, Jr.; James E. McGinness

[57] ABSTRACT

This overvoltage surge arrester has a tubular porcelain housing having a bore, metal terminals at opposite ends of the porcelain housing, stacks of metal-oxide varistor disks located within the housing in angularly-spaced relationship about the bore, and venting means within the terminals for venting gases from the housing should an electric arc develop within the housing as a result of failure of a varistor disk. First liners of electrical insulating material having relatively high thermal conductivity are sandwiched between the stacks and the bore for providing effective heat transfer between the stacks and the porcelain housing. Additional liners are disposed on the bore in locations angularly between the first liners. These additional liners are of a thermal and electrical insulating material, a major portion of which is a ceramic selected from the group of alumina, thoria, zirconia, zircon, and spinel. This thermal and electrical insulating material has a relatively low thermal conductivity and low ablation compared to the material of the first liners and is collapsible in response to arc-produced pressures developing within said porcelain housing, thereby protecting the housing from pressure and temperature shock waves developed by the arc.

28 Claims, 4 Drawing Sheets

OVERVOLTAGE SURGE ARRESTER WITH MEANS FOR PROTECTING ITS PORCELAIN HOUSING AGAINST RUPTURE BY ARC-PRODUCED SHOCKS

FIELD OF INVENTION

This invention relates to an overvoltage surge arrester comprising a porcelain housing and metal-oxide varistors located within tile housing, and, more particularly, relates to means for protecting the porcelain housing against rupture by thermal and pressure shock waves produced by the development of a high-current arc within the housing as a result of a failure of one or more of the varistors.

BACKGROUND

The type of surge arrestor that we are concerned with comprises a tubular porcelain housing, electrical terminals at opposite ends of the housing, and one or more stacks of metal-oxide varistors within the housing electrically connected between the terminals. When a voltage surge appears across the arrester, the varistors normally act in a conventional manner to pass surge currents through the arrester, thereby protecting any equipment shunted by the arrester from damage by the surge. Normally, the arrester can pass the surge current and any follow current without any electric arc being developed within the arrester housing. In the unusual event that a varistor should fail in service, an electric arc could rapidly develop within the housing alongside a stack of varistors, thereby abruptly generating very hot gases and resulting elevated pressures and temperatures within the housing.

For protecting against such internal pressures and temperatures, a typical arrester comprises means defining pressure-relief passageways leading to the terminals at opposite ends of the housing and venting means associated with the terminals for venting the arc-produced gases through the terminals. Such venting means is normally sealed by pressure-sensitive diaphragms or the like which rupture or otherwise operate in response to the elevated pressure to permit a rapid escape of the arc-generated gases. It is also conventional to utilize the escaping hot gases to transfer the arc from within the arrester housing to a pair of spaced electrodes located outside the housing and respectively connected to the terminals of the arrester. A rapid transfer of the arc from within the housing to an external location is highly desirable in limiting the pressure and temperature build-ups within the housing.

In certain circuit applications, if an internal arc such as above described should develop, the overvoltage surge arrester is subjected to an extremely high rate of energy input that can cause the pressure and temperature build-ups within the housing to rupture the porcelain housing, even despite the presence of conventional venting means for the arc-generated gases. One such circuit application is the use of the above type of surge arrester in series-capacitor compensation schemes. In such schemes, the surge arrester is connected across a series capacitor bank, and this parallel combination is connected in series with a power line. Should a varistor fail in such service, there is a likelihood that an arc will be established within the arrester housing, and the series capacitor bank will discharge through this internally-located arc, developing a very high current (typically 300–400 kA peak) with a high frequency (typically 2,000–3,000 Hz); and this will usually be coincident with a high 60 Hz current (typically 10–40 kA rms) from the line source. This combination of currents imposes an extremely high rate of energy input on the arrester early in the failure event that, unless effectively protected against, can result in rupture of the porcelain housing of the arrester in a violent manner.

In seeking to solve this problem, we have conducted tests, using as test samples arresters in which the housing was constructed of a higher strength porcelain than standard strength porcelain. In some of these test samples, we have left the bore of the housing unlined, and in others we have lined the bore with a layer of silicon rubber intended to thermally shield the porcelain housing from the high-temperature arc, as well as to mechanically shield it from any shrapnel (such as pieces of the failed varistor disks) that might strike it. These test samples failed when subjected to the above-described high currents. With regard to the latter test samples, it appears that the silicon rubber liner ablates rapidly in the presence of the high-current arc and actually adds to the internal gas pressure.

We also tested a representative arrester in which the housing bore was provided with a Teflon liner. Teflon was selected because it is a material often used in the presence of arcs, as it generates when exposed to an arc a gas that lowers the arc temperature and cools the housing walls. This test sample also failed when subjected to the above-described high currents.

OBJECTS

An object of our invention is to provide a surge arrester that includes simple and relatively inexpensive means that has exceptional ability to prevent the porcelain arrester housing from rupturing should a high current arc develop therein.

Another object is to provide in a surge arrester that is subject to the extreme high rate of energy input during a varistor failure described above in a series-capacitor compensation scheme, means capable of preventing the porcelain housing of the arrester from rupturing in response to arc-produced pressures and temperatures developed therein when the series-capacitor discharges through the failed arrester.

SUMMARY

In carrying out the invention in one form, we provide a surge arrester comprising a tubular porcelain housing having a bore, metal terminals of opposite ends of the housing, stacks of metal-oxide varistor disks within the housing in angularly-spaced relationship about the bore, and venting means within the terminals for venting gases from the housing should an electric arc develop therein as a result of failure of a varistor disk. Sandwiched between the stacks and the bore are first liners of electrical insulating material having relatively high thermal conductivity for providing effective heat transfer from the stacks to the porcelain housing. These first liners are angularly spaced about the bore. Additional liners are disposed on the bore in locations angularly between the first liners. The additional liners are of thermal and electrical insulating material, a major portion of which is a ceramic selected from the group consisting of alumina, thoria, zirconia, zircon, and spinel.

This thermal and electrical insulating material has a relatively low thermal conductivity and low ablation rate compared to the material of the first liners and is collapsible in response to arc-produced pressures developing within the housing, thereby providing a cushioning effect that protects the housing from pressure and temperature shock waves developed by the arc. A preferred material for the additional liners is a porous material of fibrous alumina.

BRIEF DESCRIPTION OF FIGURES

For a better understanding of the invention, reference may be had to the following detailed description taken in connection with the accompanying drawings, wherein.

DETAILED DESCRIPTION OF EMBODIMENTS

Figure 1:
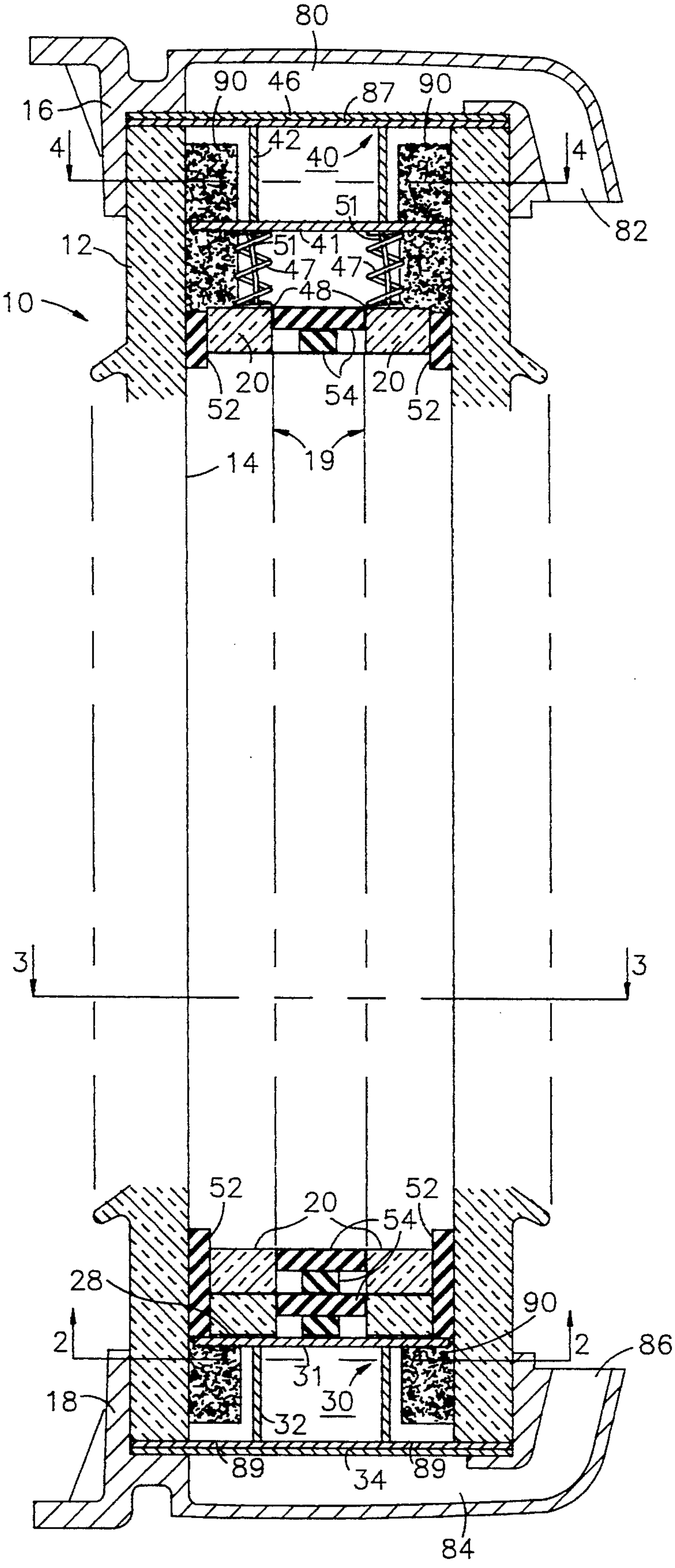
FIG. 1 is a side elevational view in section showing a surge arrester embodying one form of our invention.
Figure 3:
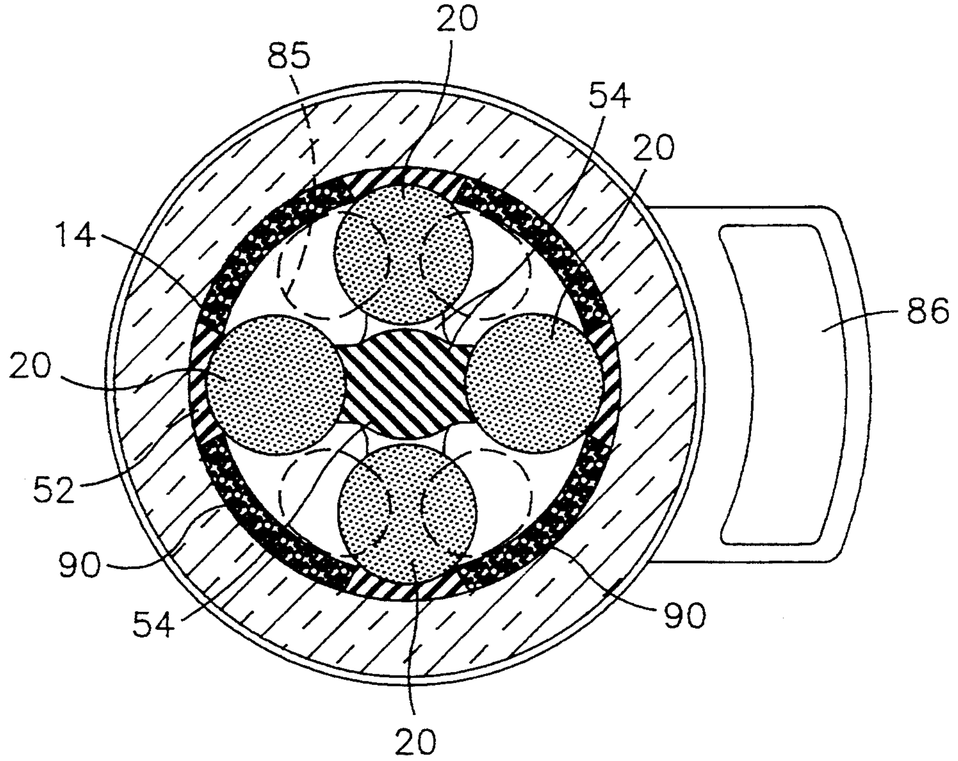
FIG. 3 is a sectional view along the line 3—3 of FIG. 1.

Referring now to FIGS. 1 and 3, the illustrated overvoltage surge arrester 10 comprises a tubular porcelain housing 12 having a bore 14 extending between the upper and lower ends of the housing. Fixedly mounted on the upper end of the housing 12 is a first metal end cap 16 serving as one terminal of the arrester, and fixedly mounted on the lower end of the housing is a second metal cap 18 serving as the opposite terminal of the arrester. Electrically connected between the two terminals 16 and 18 are four stacks 19 of varistors 20, the stacks being located adjacent the bore 14 of the housing and angularly spaced thereabout by equal distances, as best shown in FIG. 3.

Figure 5:
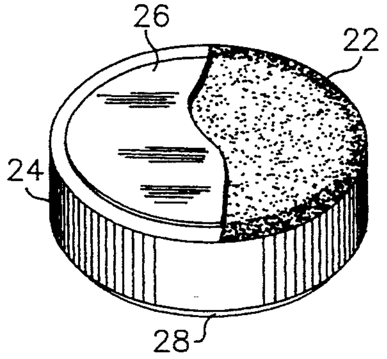
FIG. 5 is an enlarged perspective view of one of the varistors contained within the arrester of FIG. 1.

Each varistor 20 is of the conventional construction depicted in FIG. 5, comprising a circular disk 22 of sintered metal-oxide material, a thin glass or ceramic collar 24 bonded to the circular outer periphery of the disk 22, and flat metal electrodes 26 and 28 bonded to the upper and lower faces of disk 22. Each disk 22 is of conventional metal oxide varistor formulation, preferably one containing as its principal constituent zinc oxide, and the electrodes 26 and 28 are of a good conductive material, preferably arc or flame sprayed aluminum. The glass or ceramic collar 24 at its axially-opposed ends terminates short of the electrodes 26 and 28, leaving the electrodes free to make good contact with the juxtaposed electrodes of adjacent varistors when the varistors are stacked and pressed axially together in the assembled arrester.

Figure 2:
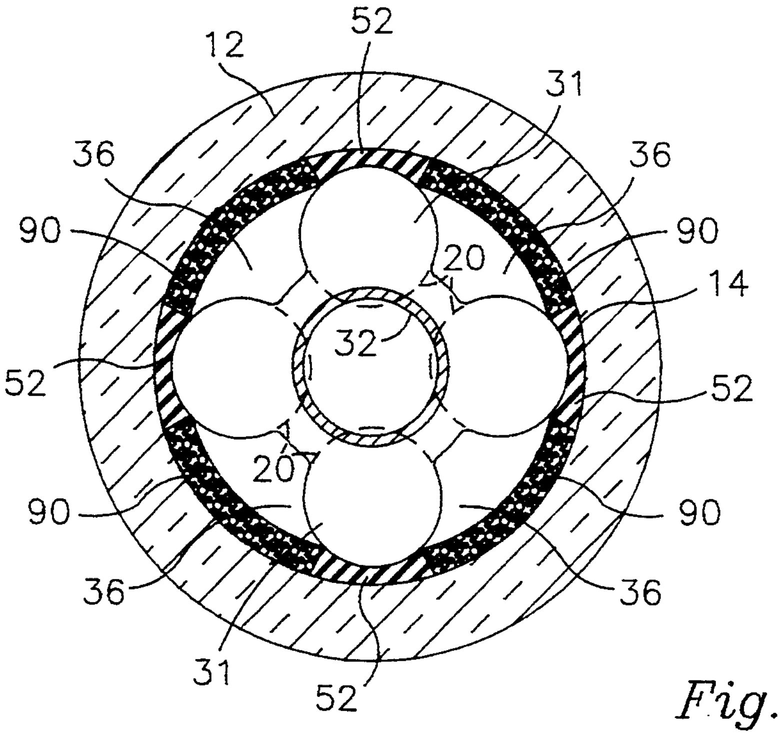
FIG. 2 is a sectional view along the line 2—2 of FIG. 1.

The varistors in each stack 19 are electrically connected in series between the terminals 16 and 18 of the arrester, and the stacks are electrically connected in parallel between these terminals. At the lower end of the arrester, the stacks 19 are electrically connected to the lower terminal 18 by a conductive support plate assembly 30 comprising an upper horizontally-disposed flat metal plate 31, a metal cylinder 32 welded at its upper end to the plate 31 and at its lower end to a metal cutter plate 34. Cutter plate 34 is in good electrical contact with the lower end cap 18. The varistor stacks 19 are seated upon the upper surface of plate 31 with the lower electrode 28 of each stack in contact with this upper surface. Referring to FIG. 2, the upper plate 31 has four U-shaped cut-out regions 36 that provide large openings through the plate through which arc-generated gases can flow should an arc develop within the arrester housing, as will soon be described.

Figure 4:
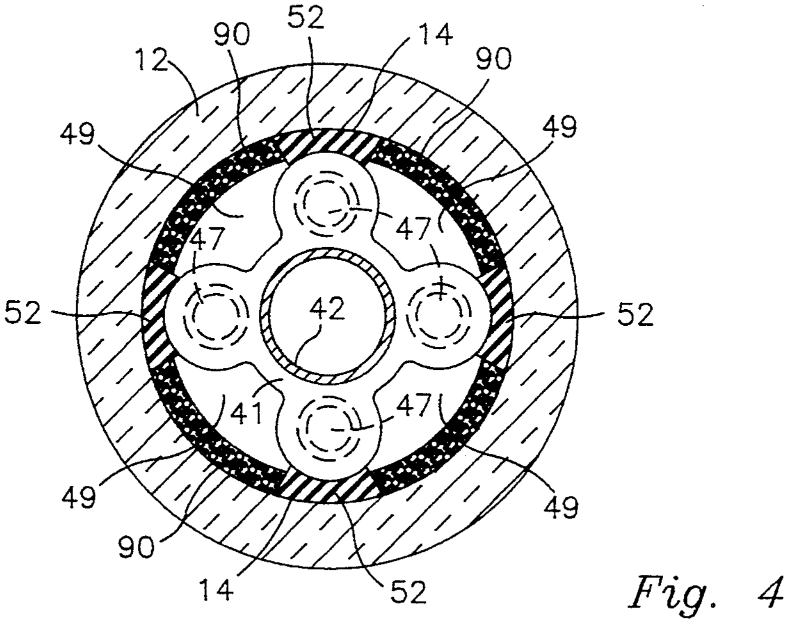
FIG. 4 is a sectional view along the line 4—4 of FIG. 1.

At the upper end of the arrester, there is a similar conductive plate assembly 40 making good electrical contact with the upper terminal 16 of the arrester. This upper conductive plate assembly comprises an upper cutter plate 46 that contacts the upper terminal 16, a metal cylinder 42 welded at its upper end to plate 46 and at its lower end to a flat horizontally-disposed lower plate 41. Between this lower plate 41 and the top of the varistor stacks are four compression springs 47. Each of these compression springs bears at its upper end against plate 41 and at its lower end against one of four contact plates 48 respectively seated atop the varistor stacks 19. These compression springs 47 urge their associated varistor stacks downwardly against the conductive support plate 31 at the bottom end of the arrester, thereby compressing the stacks and maintaining good electrical contact between the adjacent electrodes of the juxtaposed varistors in each stack. Suitable conductive and flexible shorting straps (51) electrically connect the contact plates 48 and the lower plate 41 to provide electrical connections around the springs 47 between plates 48 and 41, thereby completing the electrical connection between the upper terminal 16 and the tops of the varistor stacks. Referring to FIG. 4, it is noted that the plate 41, like its counterpart 31 at the bottom of the arrester, has four U-shaped cut-out regions (49) therethrough that provide large openings through the plate through which arc-generated gases can flow, should an arc develop within the arrester, as will soon be described.

Because the varistors 20 are continuously connected between the terminals 16 and 18 of the arrester, a low but continuous current will flow through the varistors, and this current will cause a small amount of power to be dissipated by the varistors at normal system voltage and at normal operating temperature. The magnitude of both the current and the resulting power increases as the varistor temperature increases. To prevent thermal runaway not only under these continuous current conditions but also when high current surges flow through the varistors, means is provided for effectively transferring heat from the varistors to the porcelain housing. Referring to FIGS. 1–4, especially FIG. 3, this heat-transfer means comprises four strips, or liners, 52 of electrical insulating material having good heat-transfer properties, one strip, or liner, being provided for each varistor stack in a location between the varistor stack and the bore 14 of the porcelain housing. Each of these strips 52 extends around the perimeter of its associated varistor stack 19 for about ⅓ of the perimeter and also extends along the full length of the stack. In one embodiment of the invention, each strip 52 is of a suitable silicon rubber. The strips 52 are maintained in effective heat-transfer relationship with the bore 14 and the outer periphery of the varistor stacks 19 by a series of resilient spacer wedges 54 stacked along the length of the varistor stacks in a location radially inward of the varistor stacks and exerting radially-outward force on the varistor stacks. This radially-outward force compresses, or sandwiches, the strips 52 between the varistor stacks and the bore 14, maintaining intimate contact and an effective heat-transfer relationship between the strips 52 and the bore 14 and the varistor-stack peripheries. In the disclosed embodiment, the spacer wedges 54 are also of silicon rubber. Each of these spacer wedges 54 bears at its opposite ends against the varistors of a pair of diametrically-opposed varistor stacks. Adjacent spacer wedges are displaced by 90 degrees from each other to bear against adjacent pairs of varistor stacks that are displaced 90 degrees from each other. These spacer wedges 54 are of a conventional design and are located in a conventional position along the center line of the arrester to provide the desired radially-outwardly directed force on the varistor stacks.

As will soon be described in more detail, our arrester is especially suited for high-energy circuit applications. One such circuit application is the series-capacitor compensation scheme schematically illustrated in FIG. 6. In this circuit application, a series capacitor bank 60 is connected in series with a high voltage a.c. line 62, and the above-described overvoltage surge arrester (or arresters) 10 is connected in parallel with the series capacitor bank. A high voltage source for supplying the line 62 is schematically shown at 61, and a load connected to the line is schematically shown at 63. The parallel combination of the capacitor bank 60 and the arrester 10 are connected in series with the line 62. In the illustrated embodiment, connected in parallel with the arrester 10 is the series combination of a triggered gap 64 and an inductance 65. Connected in parallel with the triggered gap 64 and in series with the inductance 65 is a by-pass switch 66. The triggered gap 64 and the by-pass switch 66 are normally-open devices intended for operation under certain conditions, the details of which are not significant with respect to the present invention. A suitably-controlled circuit breaker 68 connects the source 61 to the power line 62 and can open under predetermined conditions to protect the circuit from certain abnormal currents, all in a conventional manner.

Under normal voltage conditions on the line 62, the varistors in the arrester 10 are in a high-resistance state. But should a fault appear on the line, the varistors will respond to the rising series capacitor voltage by switching to a low resistance state that allows excess current above the series capacitor rating to pass through the varistors while effectively limiting the voltage across them, thereby protecting the series capacitor from the excess voltage and current. Normally, when the fault is cleared, the varistors will return to their high-resistance state.

In the illustrated arrester the four parallel connected varistor stacks 19 will normally share the current through the arrester when the arrester operates as above described, and no arc will develop within the interrupter housing. Under unusual circumstances, however, one or more of the varistors 20 might fail, and this could lead to an arc developing alongside one of the varistor stacks 19. This arc would quickly lengthen and, in effect, constitute a short circuit path by-passing the varistor stacks and appearing as a short circuit across the capacitor bank 60. This could result in the capacitor bank rapidly discharging through the arrester 10, producing through the arrester a relatively high frequency current with extremely high peak values. A typical such current would have a frequency of 2,000–3,000 Hz and a peak value of 300 to 400 kA.

Figure 6:
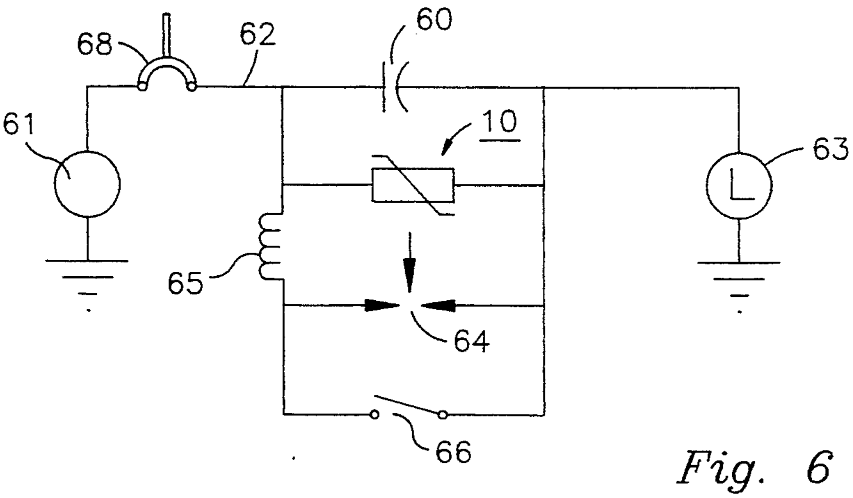
FIG. 6 is a simplified circuit diagram showing the arrester of FIG. 1 being used in a series-capacitor compensation scheme.
Figure 7:
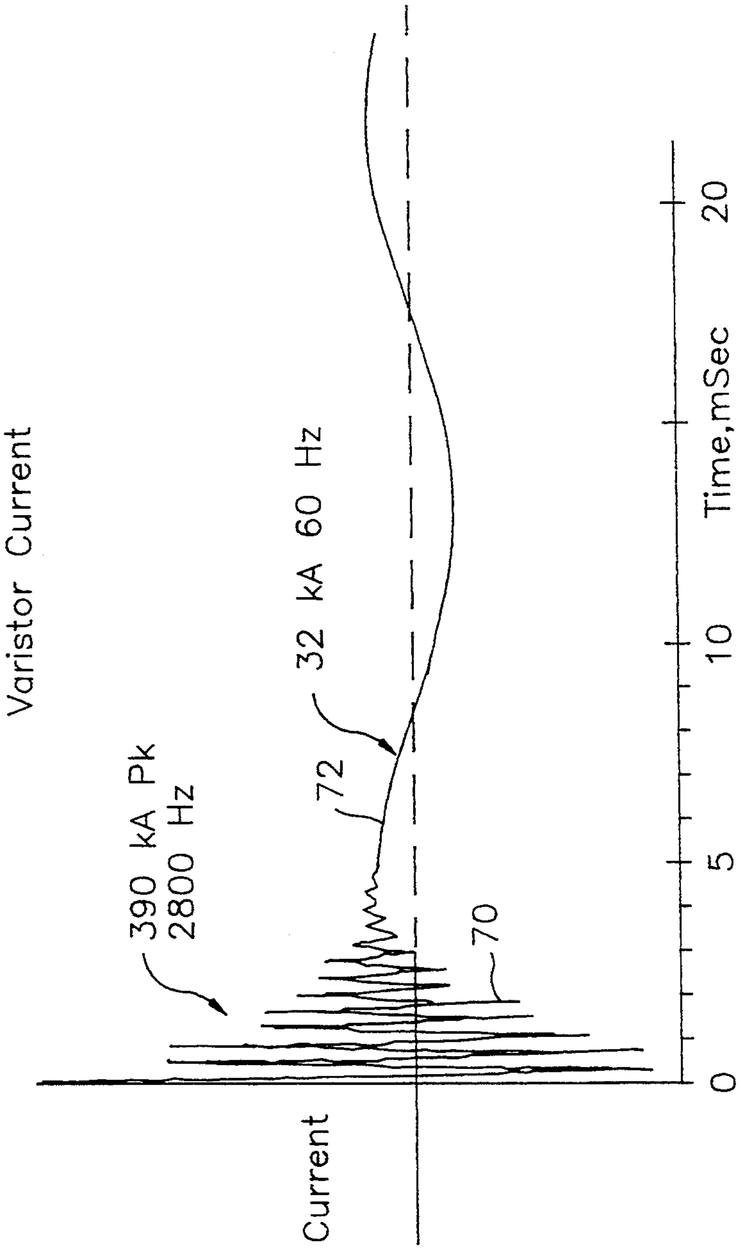
FIG. 7 is a graph illustrating certain current conditions that can possibly occur in the event that a varistor within the arrester should fail when the arrester is being used in the series-capacitor compensation scheme of FIG. 6.

Under most circumstances, this capacitor discharge current is accompanied by a high power-frequency fault current through the arrester from the source 61 of the power line 62. This power-frequency current might typically be 30 to 40 kA RMS in amplitude and 60 Hz in frequency. This current condition is represented in the graph of FIG. 6, where the capacitor discharge current is depicted at 70 and the current from the line 62 is depicted at 72. It will be apparent that this combination of high currents flowing through an arc in the arrester imposes upon the arrester an extremely high energy burden that is characterized by an extremely high rate of energy input.

To protect the porcelain housing 12 of the arrester from rupturing under these high-energy arcing conditions, the end caps 16 and 18 of the arrester are provided with venting means, which may be of a conventional design, for rapidly venting from the housing interior the hot gases developed by the high-current arc within the housing. Referring to FIG. 1, this venting means in the upper end cap 16 comprises a large exhaust passage 80 extending transversely of the housing and terminating in a nozzle 82 pointing downwardly in a location outside the housing 12. The venting means in the lower end cap 18 comprises a large exhaust passage 84 extending transversely of the housing and terminating in a lower nozzle 86 aligned with the upper nozzle 82 and pointing upwardly. The upper exhaust passage 80 is normally isolated from the interior of the housing 12 by a frangible diaphragm 87 that provides a seal between the interior and the exhaust passage 80; and the lower exhaust passage 84 is normally isolated from the interior of the housing 12 by a corresponding frangible diaphragm 89 that provides a seal between the interior and the lower exhaust passage 84. The two diaphragm 87 and 89 are preferably of metal, and each is backed-up by a cutter plate having large sharp-edge holes in it. The upper cutter plate is shown at 46 and the lower one at 34. When an arc-produced high pressure suddenly develops within the interior of the arrester, the diaphragms 87 and 89 are abruptly forced outwardly against their associated cutter plates and are cut at the sharp edges of the holes in the cutter plates, the pressure acting to expel the cut-out portions of the diaphragms through the holes in the cutter plates, all in a conventional manner. FIG. 3 shows in dotted lines 85 the location of the holes in the lower cutter plate. When the diaphragms are thus ruptured, the pressurized gas within the interior of the housing 12 is free to discharge through the exhaust passages 80 and 84 and the nozzles 82 and 86. The hot ionized gases issuing from the two nozzles converge, establishing outside the arrester housing a low dielectric strength path that quickly breaks down, allowing an arc to develop between the opposed end caps in a location outside the housing. In effect, the arc that had been inside the housing 12 is transferred to a location outside the housing. It is highly desirable to effect this arc-transfer as rapidly as possible in order to limit the quantity of gases and the resulting temperatures and pressures developed within the housing interior. The above-described rupturing of the diaphragms and transfer of the arc are, in general, conventional modes of operation in this type of arrester and are believed to require no further explanation in this application.

The main purpose of the diaphragms 87 and 89 is to provide a protective seal for the interior of the arrester that allows the interior to be filled with an appropriate gas filler isolated from the outside ambient. A preferred filler is dry air.

Although the above-described rupture of the diaphragms 87 and 89 and transfer of the arc to an outside location occur very quickly, e.g., within a few milliseconds or less following initiation of the arc within the arrester housing, we have found that under the extreme high-energy conditions described above, rupture of the porcelain housing can still be a problem in the absence of our supplemental protective means, which will now be described. This protective means, in one embodiment of the invention, comprises four liners in the form of blankets 90, each made of matted-together alumina fibers, and each extending along the length of the porcelain housing 12 in positions angularly between the heat-transfer strips 52 of the four varistor stacks. These blankets 90 are located immediately adjacent the bore 14 and are bonded thereto by a refractory adhesive that is essentially free of organic binders. The blankets 90 cover all portions of the bore 14 that are located between strips 52 so that there is essentially no exposed porcelain in this region. The blankets 90 also extend axially beyond the ends of the varistor stacks 19, covering the bore of the porcelain housing almost to its extreme opposite ends.

Our studies of arrester performance under these high-current conditions indicate that the arc that is formed upon spark-over of a varistor extends alongside one of the varistor stacks 90, quickly lengthening to substantially the whole length of the varistor stack. The intense heat and pressure developed by such an arc soon melt the alumina blanket in the channel immediately adjacent the arc and thereby convert most of this alumina blanket into a glaze that covers most of the interface that formerly was present between that particular blanket and the bore 14 of the housing. After an arcing operation, this glaze appears to be bonded to this interface.

After a high-current arcing operation, there is typically no glaze left on the bore 14 where the other blankets 90 not in the arcing channel were located. But these other blankets are typically shredded by the pressure and temperature effects of the arc, and the resulting small pieces of these blankets are ejected along with the other arcing products from the interior of the housing past the then-open diaphragms and through the nozzles 82 and 86, but without rupturing the porcelain housing 12.

The alumina blankets 90 have a number of significant properties that enable them effectively to protect the porcelain housing from being ruptured by the high current arc. One such property is their collapsibility, or compressibility, when subject to the pressure shock wave produced by the abruptly-developed arc. This collapsibility enables them to provide a cushioning effect with respect to this pressure shock wave. The fact that there are pores or spaces between the fibers of the blanket contributes to such collapsibility. Another such property of the alumina blankets is the low thermal conductivity of the alumina, which is about 4 W/m °C. at 1315° C. where W is in BTU in/hr $ft^2$ °F×0.1442. This property contributes to the ability of the alumina blanket to act as a good thermal barrier between the extremely hot arc and the porcelain bore 14 of the housing. Still another significant property of the alumina blankets 90 is the relatively high melting point (about 2,050° C.) and boiling point of the alumina. This and the high binding energy of the alumina molecule results in a high total enthalpy being required to convert solid cold alumina into ionized plasma. This causes less alumina to be ablated from the arc heat radiation and a lower increase in pressure. At lower pressure the arc develops lower arc voltage and, hence, less arc energy is released during this interval within the housing 12, thus further reducing the pressures developed. The high boiling point reduces ablation and also the volume of vapors generated by the extremely hot arc following melting of the alumina fibers, thus further reducing the pressures developed. Other properties which make alumina a superior material for this application are its excellent dielectric strength, enabling it to safely withstand the high voltages present, and its relatively low cost.

The fibrous alumina blanket material described above is available in rolls as a commercial product from Cotronics, Inc., 3379 Shore Parkway, Brooklyn, N.Y. In one form of the invention, we use blanket material ½ inch in thickness. Blankets cut from such rolls can be readily conformed to the shape of the bore 14 of the housing 12 and then cemented in place with a suitable ceramic cement also available from Cotronics. Both the blanket material and cement should be free of organic binders in order to avoid detracting from the above-discussed desirable properties of the alumina, such as reduced generation of gases by the arc.

Another material that can be used for protecting the porcelain bore 14 of the porcelain housing is a fibrous and porous alumina material available from Cotronic, Inc., as its binderless alumina paper. This alumina paper, while porous, has a higher density than the blanket material (i.e., about 12 pounds per cubic foot as compared to 6 to 12 pounds per cubic foot for the blanket material) and is therefore less compressible, and thus less effective in attenuating mechanical shock waves, than the blanket material. The higher density, however, makes the paper more effective in attenuating thermal shock waves. Our tests have shown that despite its higher density, the alumina paper can still prevent rupture of the housing 12 under the above-described conditions of high-current arcing. In the arrester used in these tests, the alumina paper material was in the form of a continuous liner, ⅛ inch thick, which extended around the whole bore 14 and behind the silicon rubber strips 52. This design is disadvantageous because the alumina paper material interferes with good heat-transfer from the rubber strips 52 to the bore 14, but our tests with this design did show that the presence of the binderless alumina paper material in liner form could prevent rupture of the housing 12 under the extreme high current conditions described above. For the same reasons as stated above, the alumina paper should be free of organic binders, as should be any cement used for adhering it to the bore 14. In the tested arrester employing the alumina paper, no cement or other adhesive was used for adhering the alumina liner to the bore 14. The liner was held in place simply by being sandwiched between the bore 14 and the rubber strips 52 at the locations of the strips.

Our invention in its broader aspects is intended to comprehend the use of an alumina foam material in place of the blankets. The pores in such foam material impart the required collapsibility to provide protection against the pressure shock wave. This foam material should also be free of organic binders.

While the above-described fibrous alumina is a preferred material for the liners 90, the following ceramic materials made up in fibrous form as blankets of relatively low density or as paper of higher density, are usable for the liners instead of the fibrous alumina: thoria, zirconia, zircon, and spinel. These materials have melting and boiling points and enthalpy required to convert solid cold material into ionized plasma near or exceeding those of alumina and thermal conductivities near or less than that of alumina and, thus, are capable of protecting the porcelain housing in a manner similar to that of alumina. But the higher cost of these other materials makes fibrous alumina the preferred material for this protective duty.

Another ceramic material that can be used for the liners 90 is beryllia in fibrous blanket or paper form. While beryllia has melting and boiling points higher than alumina and therefore good ablation properties, its thermal conductivity is higher, 29 W/m °C. at 1000° C., and this tends to decrease its effectiveness as a thermal barrier.

It is to be noted that in the illustrated embodiment the liners 90 do not extend around the entire bore 14 of the housing 12. Wherever the varistor stacks 19 are in close proximity to the bore 14, the silicon rubber strips 52 circumferentially intervene between the liners 90 and form good heat-transfer paths between the varistor stacks and the housing. This enables effective heat transfer to take place from the varistor stacks 19 to the porcelain housing 12 during normal operation of the arrester without interference from the liners 90. Since these liners 90 are of material having very low thermal conductivity, their presence in a location directly between the varistor stacks and the bore 14 would be detrimental to good heat-transfer from the varistor stacks to the porcelain housing during normal arrester operation.

While the illustrated embodiment of our invention includes four varistor stacks (19) within the housing (12), it is to be understood that the invention in its broader aspects comprehends arresters including a greater number or fewer varistor stacks within the housing.

While we have described particular embodiments of our invention, it will be obvious to those skilled in the art that various changes and modifications may be made without departing from our invention in its broader aspects; and we, therefore, intend herein to cover all such changes and modifications as fall within the true spirit and scope of our invention.

What we claim is:

1. An overvoltage surge arrester comprising:

(a) a tubular porcelain housing having a bore, (b) a pair of metal terminals at opposite ends of said tubular porcelain housing electrically insulated from each other by said housing, (c) a plurality of stacks of metal-oxide varistor disks located within said housing in angularly-spaced relationship about said bore, the disks in each stack being electrically connected in series and the stacks being electrically connected in parallel with each other between said terminals, (d) venting means within said terminals for venting gases from the interior of said housing in the event of an electric arc being developed within said housing as a result of a failure of one or more of said varistor disks, (e) first liners of electrical insulating material having relatively high thermal conductivity sandwiched between said stacks and said bore for providing effective heat transfer between said stacks and said porcelain housing, said first liners being angularly spaced-apart about said bore, and (f) additional liners on said bore in locations disposed angularly between said first liners, said additional liners being of a thermal and electrical insulating material, a major portion of which is a ceramic selected from the group consisting of alumina, thoria, zirconia, zircon, and spinel, said thermal and electrical insulating material having a relatively low thermal conductivity and low ablation compared to the material of said first liners and being collapsible in response to arc-produced pressures being developed within said housing, thereby providing a cushioning effect that protects said housing from pressure and temperature shock waves developed by said arc.

2. The overvoltage surge arrester of claim 1 in which said ceramic is alumina.

3. The overvoltage surge arrester of claim 1 in which the material of said additional liners is a porous material of alumina fibers.

4. The overvoltage surge arrester of claim 3 in which the material of said additional liners has a density in the range of 6 to 12 pounds per cubic foot.

5. The overvoltage surge arrester of claim 3 in which the material of said additional liners has a density of about 12 pounds per cubic foot.

6. The overvoltage surge arrester of claim 1 in which the material of said additional liners is an alumina foam.

7. The overvoltage surge arrester of claim 1 in which the material of said additional liners is essentially free of organic binders and said additional liners are fastened to said bore.

8. The overvoltage surge arrester of claim 1 in which the material of said additional liners is essentially free of organic binders and the additional liners are bonded to said bore by an adhesive that is essentially free of organic binders.

9. The overvoltage surge arrester of claim 1 in which the material of said additional liners is a porous and fibrous material.

10. The overvoltage surge arrester of claim 1 in which the material of said additional liners has a density in the range of 6 to 12 pounds per cubic foot.

11. The overvoltage surge arrester of claim 1 in which the material of said additional liners has a density of about 12 pounds per cubic foot.

12. The overvoltage surge arrester of claim 1 in which the material of said additional liners is a ceramic foam.

13. An overvoltage surge arrester comprising:

(a) a tubular porcelain housing having a bore, (b) a pair of metal terminals at opposite ends of said tubular porcelain housing electrically insulated from each other by said housing, (c) a plurality of stacks of metal-oxide varistor disks located within said housing in angularly-spaced relationship about said bore, the disks in each stack being electrically connected in series and the stacks being electrically connected in parallel with each other between said terminals, (d) venting means within said terminals for venting gases from the interior of said housing in the event of an electric arc being developed within said interior as a result of a failure of one or more of said varistor disks, (e) first liners of electrical insulating material having relatively high thermal conductivity sandwiched between said stacks and said bore for providing effective heat-transfer between said stacks and said porcelain housing, said first liners being angularly spaced-apart about said bore, and (f) additional liners on said bore in locations disposed angularly between said first liners, said additional liners being of a thermal and electrical insulating material, a major portion of which is beryllia, said thermal and electrical insulating material having a relatively low thermal conductivity and low ablation compared to the material of said first liners and being collapsible in response to arc-produced pressures being developed within said housing, thereby providing a cushioning effect that protects said housing from pressure and temperature shock waves developed by said arc.

14. The overvoltage surge arrester of claim 13 in which the material of said additional liners is a porous and fibrous material.

15. In a series-capacitor compensation scheme comprising a series-capacitor bank and an overvoltage surge arrester connected across the series-capacitor bank, the surge arrester being constructed as defined in claim 1.

16. In a series-capacitor compensation scheme comprising a series-capacitor bank and an overvoltage surge arrester connected across the series-capacitor bank, the surge arrester being constructed as defined in claim 2.

17. In a series-capacitor compensation scheme comprising a series-capacitor bank and an overvoltage surge arrester connected across the series-capacitor bank, the surge arrester being constructed as defined in claim 3.

18. In a series-capacitor compensation scheme comprising a series-capacitor bank and an overvoltage surge arrester connected across the series-capacitor bank, the surge arrester being constructed as defined in claim 4.

19. In a series-capacitor compensation scheme comprising a series capacitor bank and an overvoltage surge arrester connected across the series-capacitor bank, the surge arrester being constructed as defined in claim 5.

20. In a series capacitor compensation scheme comprising a series capacitor bank and an overvoltage surge arrester connected across the series-capacitor bank, the surge arrester being constructed as defined in claim 6.

21. In a series-capacitor compensation scheme comprising a series-capacitor bank and an overvoltage surge arrester connected across the series-capacitor bank, the surge arrester being constructed as defined in claim 7.

22. An overvoltage surge arrester comprising:

(a) a tubular porcelain housing having a bore, (b) a pair of metal terminals at opposite ends of said tubular porcelain housing electrically insulated from each other by said housing, (c) a stack of metal-oxide varistor disks located within said housing adjacent said bore, the disks in said stack being electrically connected in series with each other between said terminals, (d) venting means within said terminals for venting gases from the interior of said housing in the event of an electric arc being developed within said housing as a result of a failure of one or more of said varistor disks, (e) first liner structure of electrical insulating material having relatively high thermal conductivity sandwiched between said stack and said bore for providing effective heat transfer between said stack and said porcelain housing, and (f) additional liner structure on said bore in locations disposed angularly offset from said first liner structure, said additional liner structure being of a thermal and electrical insulating material, a major portion of which is a ceramic selected from the group consisting of alumina, thoria, zirconia, zircon, and spinel, said thermal and electrical insulating material having a relatively low thermal conductivity and low ablation compared to the material of said first liner structure and being collapsible in response to arc-produced pressures being developed within said housing, thereby providing a cushioning effect that protects said housing from pressure and temperature shock waves developed by said arc.

23. The overvoltage surge arrester of claim 22 in which said ceramic is alumina.

24. The overvoltage surge arrester of claim 22 in which the material of said additional liner structure is a porous material of alumina fibers.

25. The overvoltage surge arrester of claim 24 in which the material of said additional liner structure has a density in the range of 6 to 12 pounds per cubic foot.

26. The overvoltage surge' arrester of claim 24 in which the material of said additional liner structure has a density of about 12 pounds per cubic foot.

27. The overvoltage surge arrester of claim 22 in which the material of said additional inner structure is an alumina foam.

28. The overvoltage surge arrester of claim 22 in which the material of said additional liner structure is essentially free of organic binders.

* * * * *